United States Patent
Xiao et al.

(10) Patent No.: US 11,108,548 B2
(45) Date of Patent: Aug. 31, 2021

(54) AUTHENTICATION METHOD, SERVER, TERMINAL, AND GATEWAY

(71) Applicant: Huawei Technologies Co., Ltd., Guangdong (CN)

(72) Inventors: Yang Xiao, Shenzhen (CN); Yan Liu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 400 days.

(21) Appl. No.: 16/256,129

(22) Filed: Jan. 24, 2019

(65) Prior Publication Data

US 2019/0173670 A1 Jun. 6, 2019

Related U.S. Application Data

(63) Continuation of application No. PCT/CN2017/090073, filed on Jun. 26, 2017.

(30) Foreign Application Priority Data

Aug. 4, 2016 (CN) .......................... 201610635676.7

(51) Int. Cl.
*H04L 29/06* (2006.01)
*H04L 9/08* (2006.01)
(Continued)

(52) U.S. Cl.
CPC ............ *H04L 9/0819* (2013.01); *G16Y 30/10* (2020.01); *H04L 9/0631* (2013.01);
(Continued)

(58) Field of Classification Search
CPC ... H04L 9/0819; H04L 9/0631; H04L 9/0643; H04L 9/32; H04L 67/12; H04W 12/009; G16Y 30/10
See application file for complete search history.

(56) References Cited

U.S. PATENT DOCUMENTS

| | | | |
|---|---|---|---|
| 8,144,875 B2 * | 3/2012 | McGough | H04L 63/08 380/277 |
| 2007/0079368 A1 | 4/2007 | Takeyoshi et al. | |

(Continued)

FOREIGN PATENT DOCUMENTS

| | | |
|---|---|---|
| CN | 101242323 A | 8/2008 |
| CN | 102264068 A | 11/2011 |

(Continued)

OTHER PUBLICATIONS

Rabiah et al., "A Lightweight Authentication and Key Exchange Protocol for IoT", Workshop on Decentralized IoT Security and Standards (DISS) 2018, Feb. 18, 2018, pp. 1-6 (Year: 2018).*

*Primary Examiner* — Thaddeus J Plecha
(74) *Attorney, Agent, or Firm* — Slater Matsil, LLP

(57) ABSTRACT

The method provided in the embodiments of this application includes: obtaining, by a server, a first key (Ksm) shared with a gateway; receiving, by the server, an encrypted first random factor (Rand-M-Encry), a first data digest (Data-Hash), and encrypted first data (Data-Encry) that are sent by a terminal; decrypting, by the server, the Rand-M-Encry by using the Ksm, to obtain a second random factor (Rand-M'); performing, by the server, an operation on the Rand-M' and Kpsa-xi by using a second preset algorithm, to generate a third key (K'sx); decrypting, by the server, the Data-Encry by using the K'sx, to obtain second data (Data'); performing, by the server, an operation on the K'sx and the Data' based on a first preset algorithm to obtain a second data digest (Data-Hash'); and if the Data-Hash' is the same as the Data-Hash, determining, by the server, that authentication of the terminal succeeds.

9 Claims, 5 Drawing Sheets

(51) Int. Cl.
*H04L 29/08* (2006.01)
*H04W 12/00* (2021.01)
*G16Y 30/10* (2020.01)
*H04L 9/06* (2006.01)
*H04L 9/32* (2006.01)
*H04L 12/66* (2006.01)

(52) U.S. Cl.
CPC .............. *H04L 9/0643* (2013.01); *H04L 9/08* (2013.01); *H04L 9/32* (2013.01); *H04L 12/66* (2013.01); *H04L 67/12* (2013.01); *H04W 12/009* (2019.01)

(56) References Cited

U.S. PATENT DOCUMENTS

| | | | |
|---|---|---|---|
| 2008/0181401 | A1 | 7/2008 | Picquenot et al. |
| 2013/0151852 | A1* | 6/2013 | Bian ........................ H04L 9/321 |
| | | | 713/168 |
| 2015/0281116 | A1* | 10/2015 | Ko ........................ H04L 9/3242 |
| | | | 713/171 |
| 2016/0050562 | A1 | 2/2016 | Pudney et al. |

FOREIGN PATENT DOCUMENTS

| | | |
|---|---|---|
| CN | 105376737 A | 3/2016 |
| EP | 2590356 B1 | 11/2014 |
| WO | 2006095076 A1 | 9/2006 |

\* cited by examiner

AUTHENTICATION METHOD, SERVER, TERMINAL, AND GATEWAY

CROSS-REFERENCE TO RELATED APPLICATIONS

This application is a continuation of International Application No. PCT/CN2017/090073, filed on Jun. 26, 2017, which claims priority to Chinese Patent Application No. 201610635676.7, filed on Aug. 4, 2016, the disclosures of the aforementioned applications are hereby incorporated by reference in their entireties.

TECHNICAL FIELD

The present application relates to the communications field, and in particular, to an authentication method, a server, a terminal, and a gateway.

BACKGROUND

In an Internet of Things (IoT) system, there is a scenario in which a terminal communicates with a server by using a gateway. To determine validity of an application installed on the terminal, and ensure security of subsequent communication between the application on the terminal and the server, the server needs to authenticate the application installed on the terminal device.

In the IoT system, many gateways may group terminals having a same feature such as a same region, a same attribute, or a same service into one group. Therefore, a group authentication solution is proposed in the industry. An authentication process of the solution includes: Terminals in a group perform authentication with a gateway one by one, and on behalf of the terminals in the group, the gateway performs unified authentication with a server once; and then the server delivers a random number to the terminals in the group by using the gateway, where the random number is used to generate a key (e.g., an IoT Secure Connection Key or Ks) for an application and the server. The Ks is used to ensure security of communication between the terminal and the platform server.

In the solution, when performing authentication with the terminal, the server needs to send the random number to the terminal by using the gateway. However, there are a plurality of terminals in the group, causing a large amount of information interaction between the server and the gateway, and increasing load of the server.

SUMMARY

Embodiments of this application provide an authentication method, a server, a terminal, and a gateway, to reduce information interaction between the server and the gateway in an authentication phase, so as to reduce load of the server.

According to a first aspect, an embodiment of this application provides an authentication method, including:

obtaining, by a server, a first key Ksm shared with a gateway; after the server receives an encrypted first random factor Rand-M-Encry, a first data digest Data-Hash, and encrypted first data Data-Encry that are sent by a terminal, decrypting, by the server, the Rand-M-Encry by using the stored Ksm, to obtain a second random factor Rand-M'; performing, by the server, an operation on the Rand-M' and Kpsa-xi by using the second preset algorithm, to generate a third key K'sx; decrypting, by the server, the Data-Encry by using the K'sx, to obtain second data Data'; performing, by the server, an operation on the K'sx and the Data' based on a first preset algorithm to obtain a second data digest Data-Hash'; and if the Data-Hash' is the same as the Data-Hash, determining, by the server, that authentication on the terminal succeeds, where the Rand-M-Encry is generated by the gateway by encrypting a first random factor Rand-M by using the Ksm, the Data-Hash is obtained by the terminal by performing an operation on a second key Ksx and first data Data based on the first preset algorithm, the Data-Encry is obtained by the terminal by encrypting the Data by using the Ksx, the Ksx is generated by the terminal by performing an operation on the Rand-M and the shared key Kpsa-xi that is of the terminal and the server by using the second preset algorithm, the Kpsa-xi, the first preset algorithm, and the second preset algorithm are preconfigured by the terminal and the server, and the Rand-M is generated by the gateway and sent to the terminal.

In this embodiment of this application, in an authentication process with the terminal, the server completes authentication based on the Rand-M-Encry, the Data-Encry, and the Data-Hash that are sent by the terminal instead of completing authentication by sending a random number to the terminal by using the gateway, so that information interaction between the server and the gateway is greatly reduced, and load of the server is reduced.

In a possible design, when the server obtains the first key Ksm shared with the gateway, the server may use the following manners:

In a possible implementation, the server obtains a third random factor Rand-author, where the Rand-author is shared by the server with the gateway; and the server performs a third preset algorithm on the Rand-author and a second shared key Kpsa-mi to generate the first key Ksm, where the Kpsa-mi is preconfigured by the server and the gateway, and the third preset algorithm is preconfigured by the server and the gateway or is determined through negotiation between the server and the gateway.

In another possible implementation, the server and the gateway preconfigure the first key Ksm.

In this embodiment of this application, after performing authentication once, the server and the gateway may not perform second authentication in a specific time period. However, for security in actual application, the server and the gateway may further perform two-way authentication after a preset time period. A specific implementation is not limited herein.

In this embodiment of this application, a quantity of times of authentication between the server and the gateway is reduced, and in addition, a quantity of times of information interaction between the server and the gateway is reduced, helping reduce load of the server.

In a possible design, when obtaining the third random factor Rand-author, the server may use the following manner: generating, by the server, the Rand-author, or receiving, by the server, the Rand-author sent by the gateway.

In this embodiment of this application, the server implements the authentication process in a plurality of manners, helping reduce load of the server.

In a possible design, the first preset algorithm is a hash operation, the second preset algorithm is a hash-based message authentication code algorithm HMAC-SHA-256, and the third preset algorithm is the hash-based message authentication code algorithm HMAC-SHA-256.

In actual application, the first preset algorithm may alternatively be an algorithm of a series such as a message digest algorithm 5 (MD5) or a secure hash algorithm (SHA). The second preset algorithm and the third preset algorithm may alternatively be algorithms such as an Advanced Encryption Standard (AES), a Data Encryption Standard (DES), a Triple Data Encryption Standard (3DES), an International Data Encryption Algorithm (IDEA), a Triple Data Encryption Algorithm (TDEA), a parameter-variable block cipher algorithm RC5, and Blowfish. A specific implementation is not limited herein.

According to a second aspect, an embodiment of this application provides an authentication method, including: obtaining, by a gateway, a first key Ksm shared with a server; then generating, by the gateway, a first random factor Rand-M; encrypting, by the gateway, the Rand-M by using the Ksm, to generate an encrypted first random factor Rand-M-Encry; and after the gateway and a terminal complete two-way authentication, sending, by the gateway, the Rand-M-Encry and the Rand-M to the terminal, so that the terminal generates a second key Ksx based on the Rand-M.

In this embodiment of this application, in an authentication system, a function of generating and delivering a random number is transferred from the server to the gateway, effectively reducing interaction between the server and the gateway in a process in which the server and the terminal perform authentication.

In a possible design, when the gateway obtains the first key Ksm shared with the server, the gateway may use the following manners:

In a possible implementation, the gateway obtains a third random factor Rand-author, where the Rand-author is shared by the server with the gateway; and the gateway performs a third preset algorithm on the Rand-author and a second shared key Kpsa-mi to generate the first key Ksm, where the Kpsa-mi is preconfigured by the server and the gateway, and the third preset algorithm is preconfigured by the server and the gateway or is determined through negotiation between the server and the gateway.

In another possible implementation, the gateway and the server preconfigure the first key Ksm.

In this embodiment of this application, after performing authentication once, the gateway and the server may not perform second authentication in a specific time period. However, for security in actual application, the gateway and the server may further perform two-way authentication after a preset time period. A specific implementation is not limited herein. In this embodiment of this application, a quantity of times of authentication between the server and the gateway is reduced, and in addition, a quantity of times of information interaction between the server and the gateway is reduced, helping reduce load of the server.

In a possible design, when obtaining the third random factor Rand-author, the gateway may use the following manner: generating, by the gateway, the Rand-author; or receiving, by the gateway, the Rand-author sent by the server.

In this embodiment of this application, the gateway implements the authentication process in a plurality of manners, helping reduce load of the server.

In a possible design, the third preset algorithm is a hash-based message authentication code algorithm HMAC-SHA-256.

According to a third aspect, an embodiment of this application provides an authentication method, including:

after a terminal and a gateway complete two-way authentication, receiving, by the terminal, an encrypted random number Rand-M-Encry and a random number Rand-M that are sent by the gateway; then performing, by the terminal, a second preset algorithm on the Rand-M and a shared key Kpsa-xi that is of the terminal and a server to generate a second key Ksx; then encrypting, by the terminal, Data by using the Ksx, to obtain Data-Encry, and performing an operation on the Ksx and the Data based on a first preset algorithm to obtain Data-Hash; and finally sending, by the terminal, the Rand-M-Encry, the Data-Encry, and the Data-Hash to the server, so that the server completes authentication based on the Rand-M-Encry, the Data-Encry, and the Data-Hash, where the Rand-M-Encry is generated by the gateway by encrypting the Rand-M by using a first key Ksm, the Rand-M is generated by the gateway, the Kpsa-xi and the second preset algorithm are preconfigured by the terminal and the server, and the first preset algorithm is preconfigured by the terminal and the server.

In this embodiment of this application, in an authentication process of the terminal and the server, the terminal no longer receives a random number sent by the server to generate a key, but sends the Rand-M-Encry, the Data-Encry, and the Data-Hash to the server, to enable the server to complete authentication, greatly reducing information interaction between the server and the gateway, and reducing load of the server.

In a possible design, the first preset algorithm is a hash operation, and the second preset algorithm is a hash-based message authentication code algorithm HMAC-SHA-256.

According to a fourth aspect, an embodiment of this application provides a server, and the server has a function of implementing the server in the foregoing method. The function may be implemented by hardware, or may be implemented by hardware by executing corresponding software. The hardware or the software includes one or more modules corresponding to the foregoing function.

In a possible implementation, the server includes:
a processing module, configured to obtain a first key Ksm shared with a gateway; and
a receiving module, configured to receive an encrypted first random factor Rand-M-Encry, a first data digest Data-Hash, and encrypted first data Data-Encry that are sent by a terminal, where the Rand-M-Encry is generated by encrypting a first random factor Rand-M by using the Ksm, the Data-Hash is obtained by performing an operation on a second key Ksx and first data Data based on a first preset algorithm, the Data-Encry is obtained by encrypting the Data by using the Ksx, the Ksx is generated by performing an operation on the Rand-M and a shared key Kpsa-xi that is of the terminal and the server by using the second preset algorithm, the Kpsa-xi, the first preset algorithm, and the second preset algorithm are preconfigured by the terminal and the server, and the Rand-M is generated by the gateway and sent to the terminal, where the processing module is further configured to: decrypt the Rand-M-Encry by using the stored Ksm, to obtain a second random factor Rand-M'; perform an operation on the Rand-M' and the Kpsa-xi by using the second preset algorithm, to generate a third key K'sx; decrypt the Data-Encry by using the K'sx, to obtain second data Data'; perform an operation on the K'sx and the Data' based on the first preset algorithm to obtain a second data digest Data-Hash'; and if the Data-Hash' is the same as the Data-Hash, determine that authentication on the terminal succeeds.

In another possible implementation, the server includes:
a transceiver, a processor, and a bus, where
the transceiver is connected to the processor by using the bus;
the processor performs the following step:
obtaining a first key Ksm shared with a gateway;
the transceiver performs the following step:

receiving an encrypted first random factor Rand-M-Encry, a first data digest Data-Hash, and encrypted first data Data-Encry that are sent by a terminal, where the Rand-M-Encry is generated by encrypting a first random factor Rand-M by using the Ksm, the Data-Hash is obtained by performing an operation on a second key Ksx and first data Data based on a first preset algorithm, the Data-Encry is obtained by encrypting the Data by using the Ksx, the Ksx is generated by performing an operation on the Rand-M and a shared key Kpsa-xi that is of the terminal and the server by using the second preset algorithm, the Kpsa-xi, the first preset algorithm, and the second preset algorithm are preconfigured by the terminal and the server, and the Rand-M is generated by the gateway and sent to the terminal; and the processor further performs the following steps:

decrypting the Rand-M-Encry by using the stored Ksm, to obtain a second random factor Rand-M'; performing an operation on the Rand-M' and the Kpsa-xi by using the second preset algorithm, to generate a third key K'sx; decrypting the Data-Encry by using the K'sx, to obtain second data Data'; performing an operation on the K'sx and the Data' based on the first preset algorithm to obtain a second data digest Data-Hash'; and if the Data-Hash' is the same as the Data-Hash, determining that authentication on the terminal succeeds.

According to a fifth aspect, an embodiment of this application provides a gateway, and the gateway has a function of implementing the gateway in the foregoing method. The function may be implemented by hardware, or may be implemented by hardware by executing corresponding software. The hardware or the software includes one or more modules corresponding to the foregoing function.

In a possible implementation, the gateway includes:

a processing module, configured to: obtain a first key Ksm shared with a server; generate a first random factor Rand-M; and encrypt the Rand-M by using the Ksm, to generate an encrypted first random factor Rand-M-Encry; and a sending module, configured to: after the gateway and a terminal complete two-way authentication, send the Rand-M-Encry and the Rand-M to the terminal, so that the terminal generates a second key Ksx based on the Rand-M.

In another possible implementation, the gateway includes:

a transceiver, a processor, and a bus, where the transceiver is connected to the processor by using the bus:

the processor performs the following steps:

obtaining a first key Ksm shared with a server; generating a first random factor Rand-M; and encrypting the Rand-M by using the Ksm, to generate an encrypted first random factor Rand-M-Encry; and the transceiver performs the following step:

after the gateway and a terminal complete two-way authentication, sending the Rand-M-Encry and the Rand-M to the terminal, so that the terminal generates a second key Ksx based on the Rand-M.

According to a sixth aspect, an embodiment of this application provides a terminal, and the terminal has a function of implementing the terminal in the foregoing method. The function may be implemented by hardware, or may be implemented by hardware by executing corresponding software. The hardware or the software includes one or more modules corresponding to the foregoing function.

In a possible implementation, the terminal includes:

a receiving module, configured to: after the terminal and a gateway complete two-way authentication, receive an encrypted random number Rand-M-Encry and a random number Rand-M that are sent by the gateway, where the Rand-M-Encry is generated by the gateway by encrypting the Rand-M by using a first shared key Ksm, and the Rand-M is generated by the gateway;

a processing module, configured to: perform a second preset algorithm on the Rand-M and a shared key Kpsa-xi that is of the terminal and a server to generate Ksx, where the Kpsa-xi and the second preset algorithm are preconfigured by the terminal and the server; and encrypt Data by using the Ksx, to obtain Data-Encry, and perform an operation on the Ksx and the Data based on a first preset algorithm to obtain Data-Hash, where the first preset algorithm is preconfigured by the terminal and the server; and a sending module, configured to send the Rand-M-Encry, the Data-Encry, and the Data-Hash to the server, so that the server completes authentication based on the Rand-M-Encry, the Data-Encry, and the Data-Hash.

In another possible implementation, the terminal includes:

a transceiver, a processor, and a bus, where the transceiver is connected to the processor by using the bus;

the transceiver performs the following step:

after the terminal and a gateway complete two-way authentication, receiving an encrypted random number Rand-M-Encry and a random number Rand-M that are sent by the gateway, where the Rand-M-Encry is generated by the gateway by encrypting the Rand-M by using a first shared key Ksm, and the Rand-M is generated by the gateway;

the processor performs the following steps:

performing a second preset algorithm on the Rand-M and a shared key Kpsa-xi that is of the terminal and a server to generate Ksx, where the Kpsa-xi and the second preset algorithm are preconfigured by the terminal and the server; and encrypting Data by using the Ksx, to obtain Data-Encry, and performing an operation on the Ksx and the Data based on a first preset algorithm to obtain Data-Hash, where the first preset algorithm is preconfigured by the terminal and the server; and the transceiver performs the following step:

sending the Rand-M-Encry, the Data-Encry, and the Data-Hash to the server, so that the server completes authentication based on the Rand-M-Encry, the Data-Encry, and the Data-Hash.

According to a seventh aspect, an embodiment of this application provides a computer storage medium. The computer storage medium stores program code, and the program code is used to instruct to perform the method according to the first aspect, the second aspect, or the third aspect.

According to an eighth aspect, an embodiment of this application provides an authentication system, and the authentication system includes a gateway, a server, and a terminal. The terminal and the server preconfigure a shared key and a related algorithm, the gateway and the server also need to preconfigure a shared key and obtain a related algorithm, and the terminal and the gateway also need to preconfigure a shared key and a related algorithm. The gateway and the server separately generate a shared first key Ksm by using the shared key and the algorithm. Then, after the gateway and the terminal complete two-way authentication, the gateway sends, to the terminal, a first random factor Rand-M generated by the gateway and an encrypted first random factor Rand-M-Encry generated by the gateway by encrypting the Rand-M by using the Ksm. After the terminal receives the Rand-M-Encry and the Rand-M that are sent by the gateway, the terminal performs the preconfigured algorithm on the Rand-M and a shared key Kpsa-xi that is of the terminal and the server to generate a second key Ksx. Then, the terminal may further encrypt Data by using the Ksx, to obtain Data-Encry, and perform a preconfigured operation on the Ksx and the Data to obtain Data-Hash. Finally, the terminal sends the obtained Rand-M-Encry, Data-Encry, and the Data-Hash to the server. After the server receives the Rand-M-Encry, the Data-Hash, and the Data-Encry that are sent by the terminal, because the server and the gateway separately generate the shared Ksm, the server may decrypt the Rand-M-Encry by using the Ksm, to obtain a second random factor Rand-M'. Then, the server performs an operation on the Rand-M' and the Kpsa-xi by using the algorithm preconfigured with the terminal, to generate a third key K'sx, and then the server decrypts the Data-Encry by using the K'sx, to obtain second data Data'. Then, the server performs an operation on the K'sx and the Data' based on the algorithm preconfigured by the server and the terminal, to obtain a second data digest Data-Hash'. Finally, the server compares the Data-Hash' with the Data-Hash. If the Data-Hash' is the same as the Data-Hash, the server determines that authentication on the terminal succeeds.

It can be learned from the foregoing technical solutions that, the embodiments of this application have the following advantages: In an authentication process with the terminal, the server completes authentication based on the Rand-M-Encry, the Data-Encry, and the Data-Hash that are sent by the terminal instead of completing authentication by sending a random number to the terminal by using the gateway, so that information interaction between the server and the gateway is greatly reduced, and load of the server is reduced.

DESCRIPTION OF EMBODIMENTS

Embodiments of this application provide an authentication method, a server, a gateway, and a terminal, to reduce information interaction between the server and the gateway in an authentication phase, so as to reduce load of the server.

In the specification, claims, and accompanying drawings of this application, the terms "first", "second", "third", "fourth", and so on (if any) are intended to distinguish between similar objects but do not necessarily indicate a specific order or sequence. It should be understood that the data termed in such a way are interchangeable in proper circumstances so that the embodiments described herein can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device.

Figure 1:
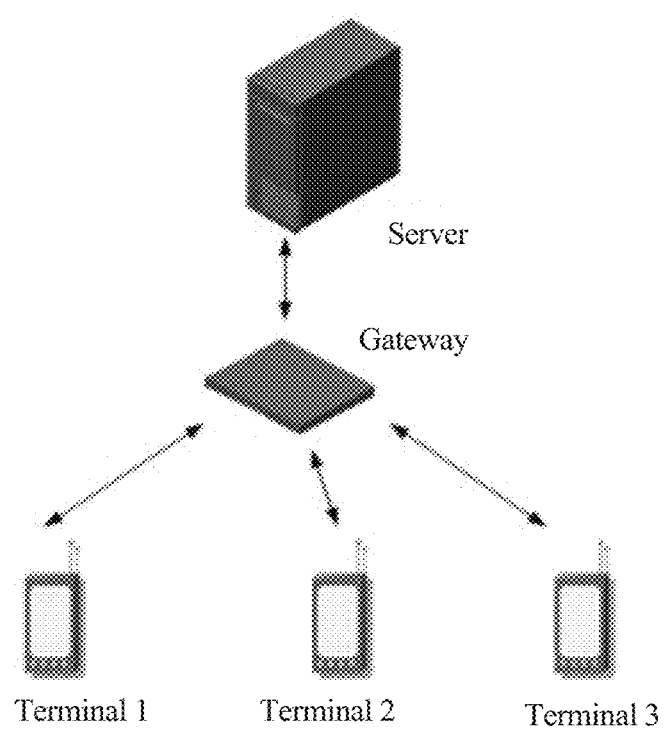
FIG. 1 is a framework diagram of a group authentication system according to an embodiment of this application.

FIG. 1 is a schematic diagram of an architecture of an authentication system according to an embodiment of the present disclosure. The authentication system includes a server, a gateway, and a terminal. In the authentication system, the terminal communicates with the server by using the gateway. To determine validity of an application installed on the terminal and security of communication between the application on the terminal and the server, the server needs to perform authentication with the terminal.

Specifically, before authentication is performed by the terminal and the server, by the terminal and the gateway, and by the server and the gateway, a shared key Kpsa-xi, a first preset algorithm, and a second preset algorithm need to be preconfigured by the terminal and the server. A shared key Kpsa-xm and a related preset algorithm need to be preconfigured by the terminal and the gateway. The gateway and the server need to obtain a third preset algorithm, and need to preconfigure a shared key Kpsa-mi. In addition, the third preset algorithm obtained by the gateway and the server may be preconfigured by the gateway and the server, or may be determined through negotiation between the gateway and the server in a process of information interaction. A manner of obtaining the third preset algorithm by the gateway and the server is not limited herein.

In actual application, a shared key, a first preset algorithm, and a second preset algorithm may be preconfigured on the terminal when the terminal is delivered from a factory. When the terminal registers with the server and performs information interaction with the server, the server can obtain the shared key Kpsa-xi, the first preset algorithm, and the second preset algorithm that are of the terminal and the server. Likewise, the shared key Kpsa-xm and the algorithm may also be configured by the terminal and the gateway in the foregoing manner, and the shared key Kpsa-mi and the algorithm may also be configured by the gateway and the server in the foregoing manner.

In this embodiment, the first preset algorithm may be a hash operation, the second preset algorithm may be a hash-based message authentication code algorithm HMAC-SHA-256, and the third preset algorithm may be the hash-based message authentication code algorithm HMAC-SHA-256. In this embodiment, the first preset algorithm, the second preset algorithm, and the third preset algorithm may be other algorithms. For example, the first preset algorithm may be an algorithm of a series such as an MD5 or an SHA. The second preset algorithm and the third preset algorithm may alternatively be algorithms such as AES, DES, 3DES, IDEA, TDEA, RC5, and Blowfish. A specific implementation is not limited herein.

The terminal related in the embodiments of this application may be a device that provides a user with voice and/or data connectivity, a handheld device with a wireless connection function, or another processing device connected to a wireless modem. A wireless terminal may communicate with one or more core networks by using a radio access network (RAN). The wireless terminal may be a mobile terminal, such as a mobile phone (also referred to as a "cellular" phone) and a computer with a mobile terminal, for example, may be a portable, pocket-sized, handheld, computer built-in, or in-vehicle mobile apparatus, which exchanges voice and/or data with the radio access network.

For example, the wireless terminal may be a device such as a personal communications service (PCS) phone, a cordless telephone set, a Session Initiation Protocol (SIP) telephone set, a wireless local loop (WLL) station, or a personal digital assistant (PDA). The wireless terminal may also be referred to as a system, a subscriber unit, a subscriber station, a mobile station, a mobile console (Mobile), a remote station, an access point, a remote terminal, an access terminal, a user terminal, a user agent, a user device, or user equipment.

Figure 2A:
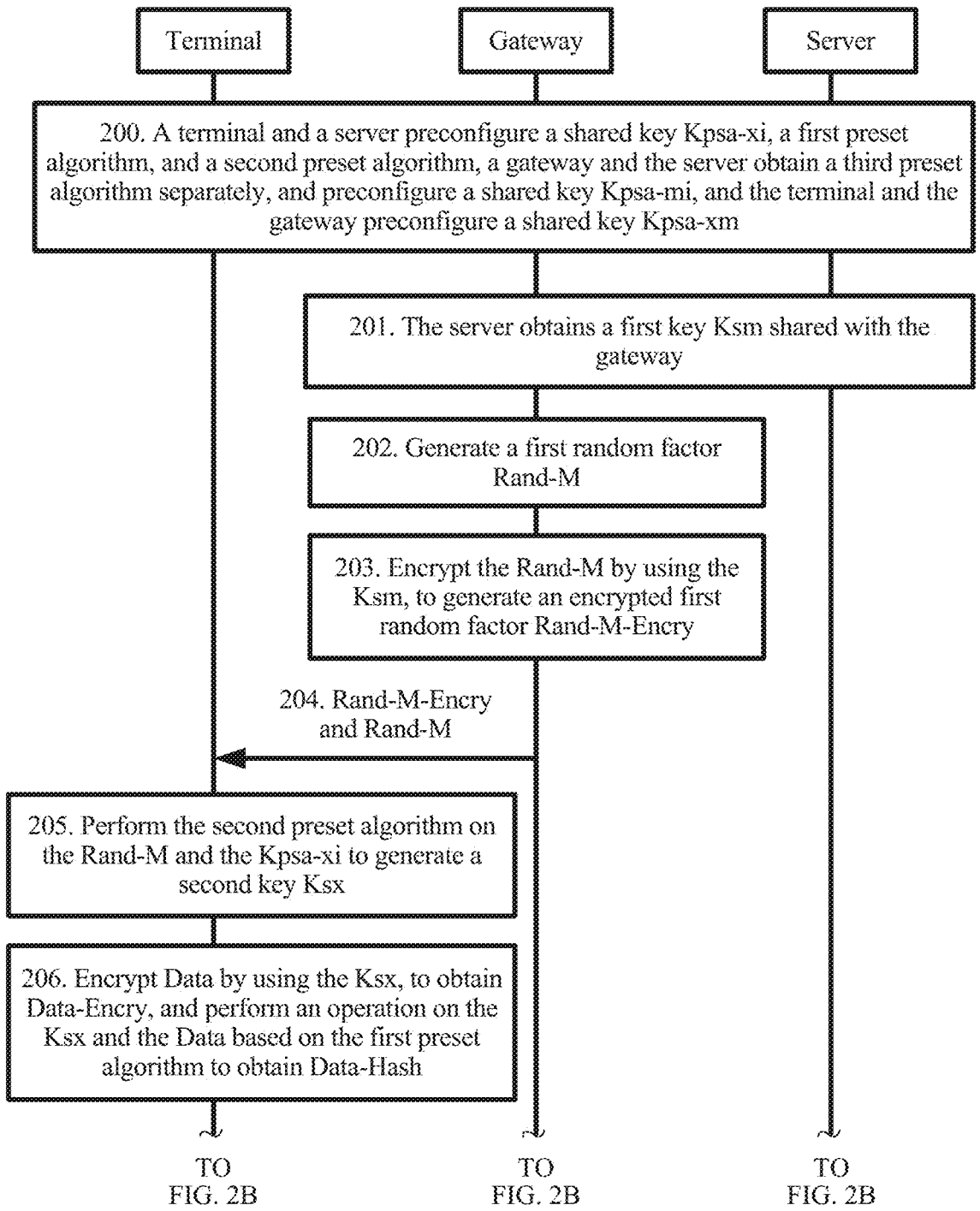
FIG. 2A and FIG. 2B are a schematic diagram of an embodiment of an authentication method according to an embodiment of this application.
Figure 2B:
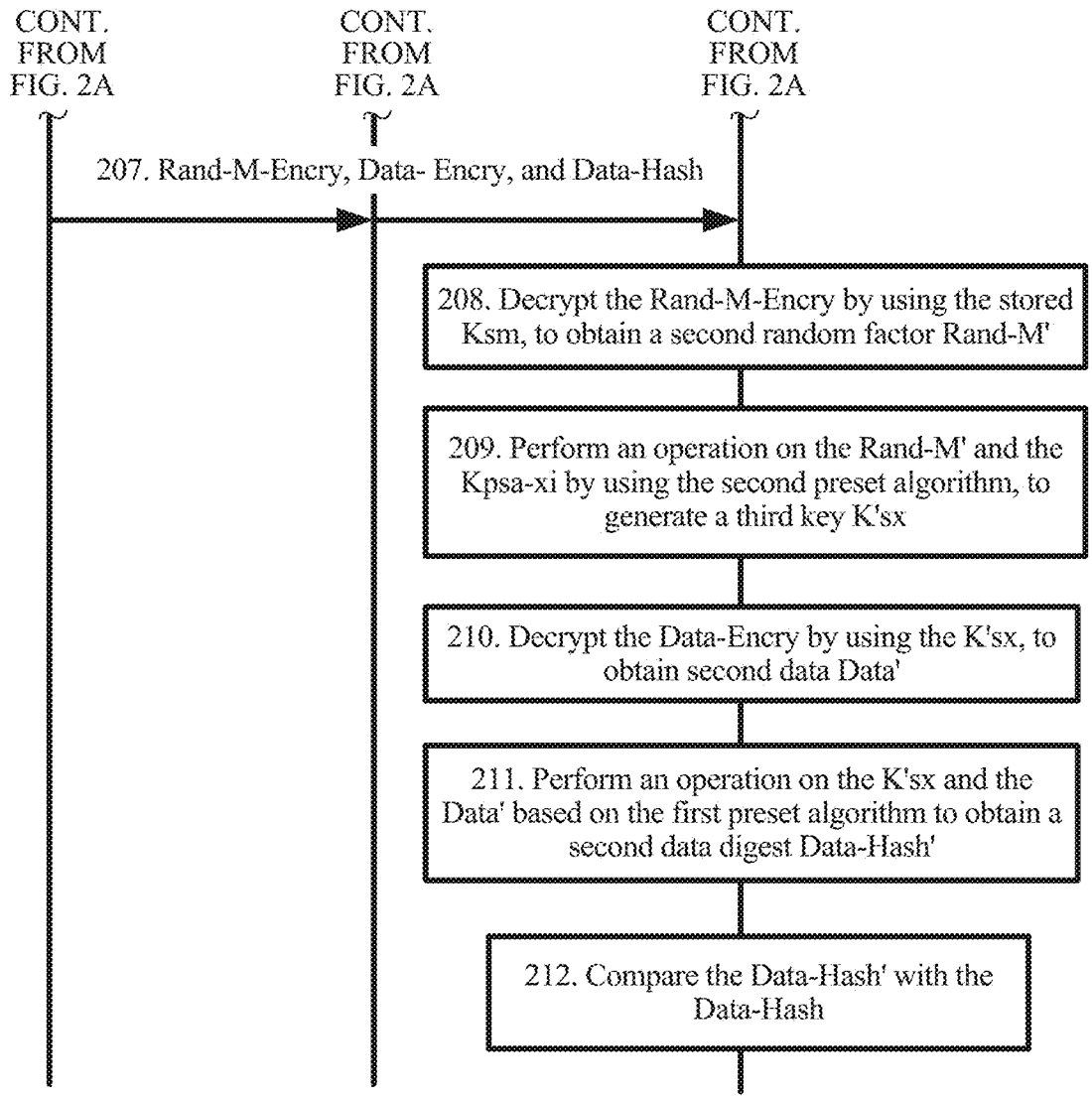

FIG. 2A and FIG. 2B are a flowchart of an authentication method according to an embodiment of the present disclosure. In the authentication method, a terminal, a server, and a gateway have the same functions as those of the terminal, the server, and the gateway in FIG. 1. Specifically, the method includes the following steps.

200. The terminal and the server preconfigure a shared key Kpsa-xi, a first preset algorithm, and a second preset algorithm, the gateway and the server obtain a third preset algorithm separately, and preconfigure a shared key Kpsa-mi, and the terminal and the gateway preconfigure a shared key Kpsa-xm.

In this embodiment, it is assumed that the shared key of the terminal and the server is 1010, the shared key of the terminal and the gateway is 1011, and the shared key of the server and the gateway is 1100. In addition, both the terminal and the server use a hash-based message authentication code algorithm HMAC-SHA-256 when generating a key, both the gateway and the server use the hash-based message authentication code algorithm HMAC-SHA-256 when generating a key, and both the terminal and the server use a hash operation when generating a data digest.

201. The server obtains a first key Ksm shared with the gateway.

After authentication between the server and the gateway succeeds, the server and the gateway generate a shared random number Rand-author, and the server and the gateway separately generate the Ksm based on the Rand-author and the third preset algorithm.

In this embodiment, the server and the gateway may also preconfigure the Ksm. A specific implementation is not limited herein.

In this embodiment, the server and the gateway may perform two-way authentication by using a transport layer security pre-shared key (e.g., Pre-Shared Key Ciphersuites for Transport Layer Security (TLS-PSK)). Herein, the server and the gateway may perform two-way authentication in a plurality of manners, and a specific implementation is not limited herein.

In this embodiment, the Rand-author may be generated by the server, and then sent to the gateway; or the Rand-author may be generated by the gateway, and then sent to the server. A specific generation manner of the Rand-author is not limited herein, provided that the gateway and the server can obtain a shared random number. It is assumed that the Rand-author is 5. In an example in this embodiment, the key Ksm generated by the server and the gateway is 11100.

202. The gateway generates a first random factor Rand-M.

After the gateway and the server complete two-way authentication, the gateway may generate the Rand-M. It is assumed that the Rand-M is 4.

203. The gateway encrypts the Rand-M by using the Ksm, to generate an encrypted first random factor Rand-M-Encry.

The gateway encrypts the Rand-M by using the Ksm, to generate the Rand-M-Encry. To be specific, in this embodiment, the Rand-M-Encry includes data information 4. In addition, if the data information needs to be viewed, the Rand-M-Encry needs to be decrypted by using the key 11100, to obtain the data information 4.

204. The gateway sends the Rand-M-Encry and the Rand-M to the terminal.

After the gateway and the terminal complete two-way authentication, the gateway sends the Rand-M-Encry and the Rand-M to the terminal. In this embodiment, the terminal receives the number 4 and the encrypted data information that includes the number 4.

In this embodiment, the gateway and the terminal may perform authentication by using a TLS-PSK in a process of completing two-way authentication, or may perform authentication based on a connection manner between the gateway and the terminal. A specific implementation is not limited herein.

205. The terminal performs the second preset algorithm on the Rand-M and the Kpsa-xi to generate a second key Ksx.

After the terminal receives the Rand-M, the terminal performs the second preset algorithm on the Rand-M and the Kpsa-xi to generate the Ksx. In this embodiment, the terminal may use a hash operation SHA-256, and the finally obtained Ksx is 11011.

206. The terminal encrypts Data by using the Ksx, to obtain Data-Encry, and performs an operation on the Ksx and the Data based on the first preset algorithm to obtain Data-Hash.

After the terminal obtains the Ksx, the terminal encrypts, by using the Ksx, the Data that needs to be sent, to obtain the encrypted data Data-Encry, and performs an operation on the Ksx and the Data based on the first preset algorithm to obtain the data digest Data-Hash. In this embodiment, if the terminal sends voice data, the terminal may encrypt the voice data by using the key 11011, to obtain encrypted voice data information, and the terminal may further perform a hash operation on the key 11011 and the voice data to obtain a data digest of the voice data.

207. The terminal sends the Rand-M-Encry, the Data-Encry, and the Data-Hash to the server.

The terminal sends the Rand-M-Encry sent by the gateway and the Data-Encry and the Data-Hash that are generated by the terminal to the gateway, and then the gateway sends the Rand-M-Encry, the Data-Encry, and the Data-Hash to the server. In this embodiment, the terminal sends, to the server, the encrypted data information whose key is 11100 and that includes the number 4, the encrypted voice data information whose key is 11011, and the data digest of the voice data.

208. The server decrypts the Rand-M-Encry by using the stored Ksm, to obtain a second random factor Rand-M'.

After the server receives the Rand-M-Encry, the Data-Encry, and the Data-Hash, because the Rand-M-Encry is generated by the gateway by encrypting the Rand-M by using the Ksm, and authentication between the gateway and the server has been completed, the server may decrypt the Rand-M-Encry by using the stored Ksm, to obtain the Rand-M'. In this embodiment, the server may decrypt, by using the stored key 11100, the data information that includes the number 4 to obtain the number 4.

In this embodiment, theoretically, the Rand-M' and the Rand-M are the same, and therefore the server may generate K'sx by using the Rand-M' and the Kpsa-xi.

209. The server performs an operation on the Rand-M' and the Kpsa-xi by using the second preset algorithm, to generate a third key K'sx.

After the server obtains the Rand-M', the server performs, by using the second preset algorithm, an operation on the Rand-M' and the Kpsa-xi that is preconfigured by the server and the terminal, to generate the third key K'sx. In this embodiment, the server may perform an operation on the number 4 and 1010 by using the hash-based message authentication code algorithm HMAC-SHA-256, to obtain the K'sx, and the K'sx is 11011.

210. The server decrypts the Data-Encry by using the K'sx, to obtain second data Data'.

After the server obtains the K'sx, the server decrypts, by using the K'sx, the Data-Encry sent by the terminal, to obtain the second data Data'. In this embodiment, the key K'sx 11011 obtained by the server is the same as the key Ksx 11011 obtained by the terminal. To be specific, the server may decrypt the encrypted voice data by using 11011, to obtain the voice data sent by the terminal.

In this embodiment, theoretically, the K'sx obtained by the server is the same as the Ksx generated by the terminal. Therefore, in this embodiment, the server may decrypt, by using the K'sx, the Data-Encry sent by the terminal, to obtain the Data'.

211. The server performs an operation on the K'sx and the Data' based on the first preset algorithm to obtain a second data digest Data-Hash'.

After the server obtains the Data' and the K'sx, the server performs a hash operation on the K'sx and the Data' to obtain the Data-Hash'. In this embodiment, the server performs a hash algorithm on the voice data obtained through decryption and the generated K'sx 11011 to obtain the data digest of the voice data obtained through decryption.

In this embodiment, the server only needs to perform a preset algorithm, which is the same as that used by the terminal, on the K'sx and the Data' to generate the data digest, and a specific algorithm used by the terminal and the server to obtain the data digest is not limited herein.

212. The server compares the Data-Hash' with the Data-Hash.

After obtaining the Data-Hash', the server compares the Data-Hash' with the Data-Hash that is received by the server and that is sent by the terminal. If the Data-Hash' is the same as the Data-Hash, the server determines that authentication on the terminal succeeds. If the Data-Hash' is different from the Data-Hash, the server determines that authentication on the terminal fails.

In this embodiment, in an authentication process of the server and the terminal, the server completes authentication based on the Rand-M-Encry, the Data-Encry, and the Data-Hash that are sent by the terminal instead of completing authentication by sending a random number to the terminal by using the gateway, so that information interaction between the server and the gateway is greatly reduced, and load of the server is reduced.

The authentication method in the embodiment of this application is described above, and a server in an embodiment of this application is described below.

Figure 3:
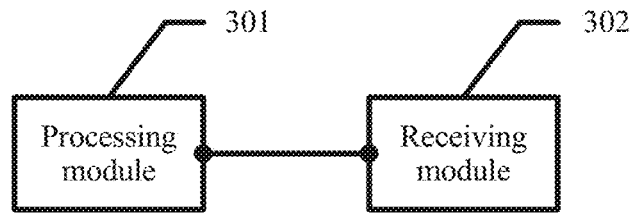
FIG. 3 is a schematic diagram of an embodiment of a server according to an embodiment of this application.

Specifically, FIG. 3 shows an embodiment of a server according to an embodiment of this application, and the server includes a processing module 301 and a receiving module 302.

The processing module 301 is configured to obtain a first key Ksm shared with a gateway.

The receiving module 302 is configured to receive an encrypted first random factor Rand-M-Encry, a first data digest Data-Hash, and encrypted first data Data-Encry that are sent by a terminal, where the Rand-M-Encry is generated by encrypting a first random factor Rand-M by using the Ksm, the Data-Hash is obtained by performing an operation on a second key Ksx and first data Data based on a first preset algorithm, the Data-Encry is obtained by encrypting the Data by using the Ksx, the Ksx is generated by performing an operation on the Rand-M and a shared key Kpsa-xi that is of the terminal and the server by using the second preset algorithm, the Kpsa-xi, the first preset algorithm, and the second preset algorithm are preconfigured by the terminal and the server, and the Rand-M is generated by the gateway and sent to the terminal.

The processing module 301 is further configured to: decrypt the Rand-M-Encry by using the stored Ksm, to obtain a second random factor Rand-M'; perform an operation on the Rand-M' and the Kpsa-xi by using the second preset algorithm, to generate a third key K'sx; decrypt the Data-Encry by using the K'sx, to obtain second data Data'; perform an operation on the K'sx and the Data' based on the first preset algorithm to obtain a second data digest Data-Hash'; and if the Data-Hash' is the same as the Data-Hash, determine that authentication on the terminal succeeds.

With reference to the foregoing embodiment, the processing module 301 is further configured to: obtain a third random factor Rand-author, where the Rand-author is shared by the server with the gateway; and perform a third preset algorithm on the Rand-author and a second shared key Kpsa-mi to generate the first key Ksm, where the Kpsa-mi is preconfigured by the server and the gateway, and the third preset algorithm is preconfigured by the server and the gateway or is determined through negotiation between the server and the gateway.

With reference to the foregoing embodiment, the processing module 301 is further configured to generate the Rand-author; or the receiving module 302 is further configured to receive the Rand-author sent by the gateway.

Further, the server in FIG. 3 may be further configured to perform any step performed by the server in FIG. 1 or FIG. 2A and FIG. 2B, to implement any function that may be implemented by the server in FIG. 1 or FIG. 2A and FIG. 2B.

In this embodiment, in an authentication process of the server and the terminal, the server completes authentication based on the Rand-M-Encry, the Data-Encry, and the Data-Hash that are sent by the terminal instead of completing authentication by sending a random number to the terminal by using the gateway, so that information interaction between the server and the gateway is greatly reduced, and load of the server is reduced.

Figure 4:
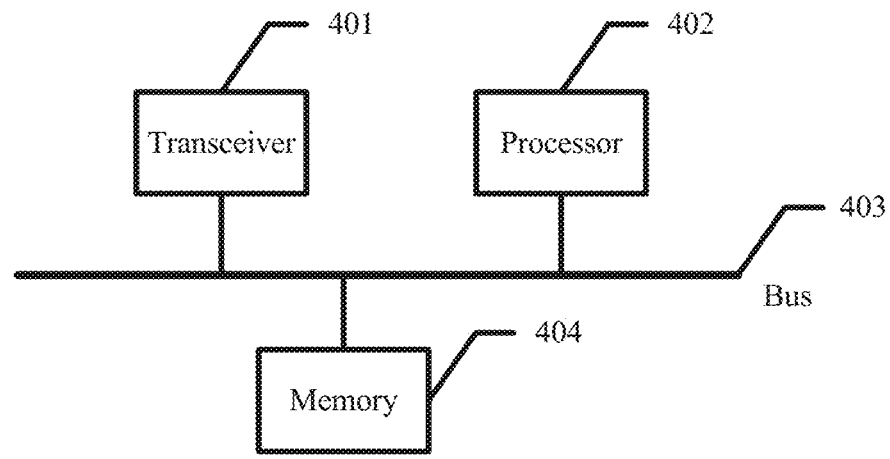
FIG. 4 is a schematic diagram of another embodiment of a server according to an embodiment of this application.

Specifically, FIG. 4 shows another embodiment of a server according to an embodiment of this application, and the server includes a transceiver 401 and a processor 402. The transceiver 401 and the processor 402 are connected to each other by using a bus 403.

The bus 403 may be a peripheral component interconnect (PCI) bus, an extended industry standard architecture (EISA) bus, or the like. The bus may be classified into an address bus, a data bus, a control bus, and the like. For ease of indication, the bus is indicated by using only one bold line in FIG. 4. However, it does not indicate that there is only one bus or only one type of bus.

The processor 402 may be a central processing unit (CPU), a network processor (NP), or a combination of a CPU and an NP.

The processor 402 may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof.

Referring to FIG. 4, the server may further include a memory 404, and the memory 404 is configured to store Ksm and K'sx.

The memory 404 may include a volatile memory, for example, a random access memory (RAM); or the memory may include a nonvolatile memory, for example, a flash memory, a hard disk drive (HDD), or a solid state drive (SSD); or the memory 404 may include a combination of the foregoing memories.

Optionally, the memory 404 may be further configured to store a program instruction. The processor 402 may perform one or more steps or an optional implementation in the embodiment shown in FIG. 2A and FIG. 2B by invoking the program instruction stored in the memory 404, to implement a function of the server in the foregoing method.

The processor 402 performs step 201 in the foregoing embodiment.

The transceiver 401 includes a radio frequency module and an antenna. The radio frequency module may be connected to the processor 402 by using the bus 403, and the radio frequency module and the antenna perform step 208 in the foregoing embodiment.

The processor 402 performs step 209 to step 212 in the foregoing embodiment.

In this embodiment, in an authentication process of the server and a terminal, the server completes authentication based on Rand-M-Encry, Data-Encry, and Data-Hash that are sent by the terminal instead of completing authentication by sending a random number to the terminal by using a gateway, so that information interaction between the server and the gateway is greatly reduced, and load of the server is reduced.

Figure 5:
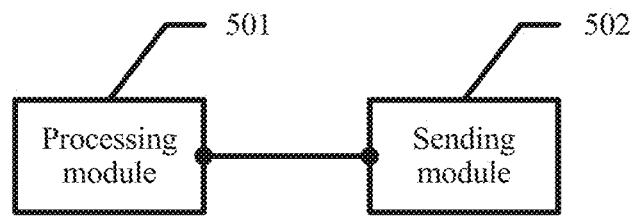
FIG. 5 is a schematic diagram of an embodiment of a gateway according to an embodiment of this application.

Specifically, FIG. 5 shows an embodiment of a gateway according to an embodiment of this application, and the gateway includes a processing module 501 and a sending module 502.

The processing module 501 is configured to: obtain a first key Ksm shared with a server; generate a first random factor Rand-M; and encrypt the Rand-M by using the Ksm, to generate an encrypted first random factor Rand-M-Encry.

The sending module 502 is configured to: after the gateway and a terminal complete two-way authentication, send the Rand-M-Encry and the Rand-M to the terminal, so that the terminal generates a second key Ksx based on the Rand-M.

With reference to the foregoing embodiment, the processing module 501 is further configured to: obtain a third random factor Rand-author, where the Rand-author is shared by the server with the gateway; and perform a third preset algorithm on the Rand-author and a second shared key Kpsa-mi to generate the first key Ksm, where the Kpsa-mi is preconfigured by the server and the gateway, and the third preset algorithm is preconfigured by the server and the gateway or is determined through negotiation between the server and the gateway.

With reference to the foregoing embodiment, the processing module 501 is further configured to generate the Rand-author; or a receiving module is configured to receive the Rand-author sent by the server.

Further, the gateway in FIG. 5 may be further configured to perform any step performed by the gateway in FIG. 1 or FIG. 2A and FIG. 2B, to implement any function that may be implemented by the gateway in FIG. 1 or FIG. 2A and FIG. 2B.

In this embodiment, after the gateway and the server perform two-way authentication, the processing module 501 generates the Rand-M, and encrypts the Rand-M by using the Ksm, to generate the Rand-M-Encry; and then the sending module 502 sends the Rand-M and the Rand-M-Encry to the terminal, so that the terminal generates the Ksx based on the Rand-M, reducing information interaction between the gateway and the server.

Figure 6:
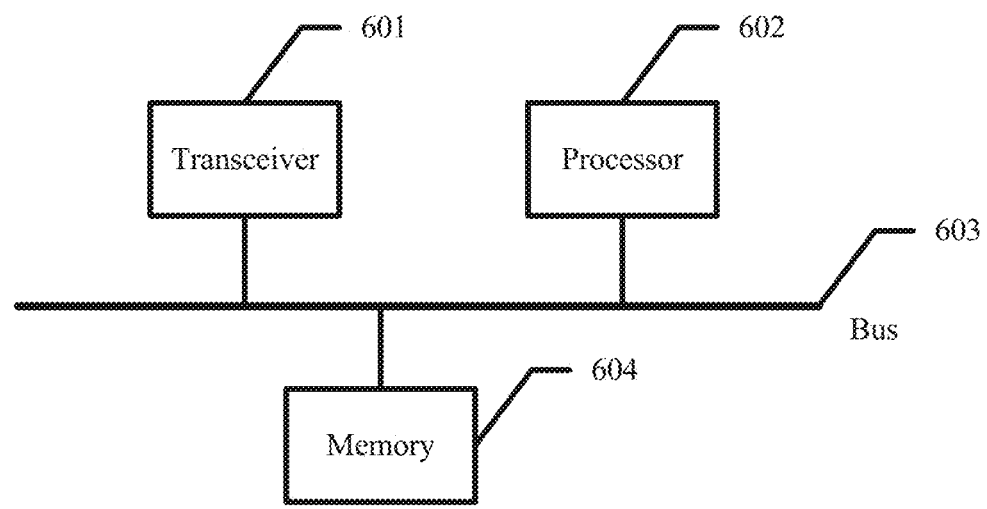
FIG. 6 is a schematic diagram of another embodiment of a gateway according to an embodiment of this application.

Specifically, FIG. 6 shows another embodiment of a gateway according to an embodiment of this application, and the gateway includes a transceiver 601 and a processor 602. The transceiver 601 and the processor 602 are connected to each other by using a bus 603.

The bus 603 may be a PCI bus, an EISA bus, or the like. The bus may be classified into an address bus, a data bus, a control bus, and the like. For ease of indication, the bus is indicated by using only one bold line in FIG. 6. However, it does not indicate that there is only one bus or only one type of bus.

The processor 602 may be a CPU, an NP, or a combination of a CPU and an NP.

The processor 602 may further include a hardware chip. The hardware chip may be an ASIC, a PLD, or a combination thereof. The PLD may be a CPLD, an FPGA, a GAL, or any combination thereof.

Referring to FIG. 6, the gateway may further include a memory 604, and the memory 604 is configured to store the Ksm.

The memory 604 may include a volatile memory, for example, a RAM; or the memory may include a nonvolatile memory, for example, a flash memory, an HDD, or an SSD; or the memory 604 may include a combination of the foregoing memories.

Optionally, the memory 604 may be further configured to store a program instruction. The processor 602 may perform one or more steps or an optional implementation in the embodiment shown in FIG. 2A and FIG. 2B by invoking the program instruction stored in the memory 604, to implement a function of the gateway in the foregoing method.

The processor 602 performs step 201 in the foregoing embodiment.

The transceiver 601 includes a radio frequency module and an antenna. The radio frequency module may be connected to the processor 602 by using the bus 603. The radio frequency module and the antenna perform an operation of sending Rand-M-Encry, Data-Encry, and Data-Hash to a server in step 202 to step 204 and step 207 in the foregoing embodiment.

In this embodiment, after the gateway and the server perform two-way authentication, the processor 602 generates Rand-M, and encrypts the Rand-M by using the Ksm, to generate the Rand-M-Encry; and then the transceiver 601 sends the Rand-M and the Rand-M-Encry to a terminal, so that the terminal generates Ksx based on the Rand-M, reducing information interaction between the gateway and the server.

Figure 7:
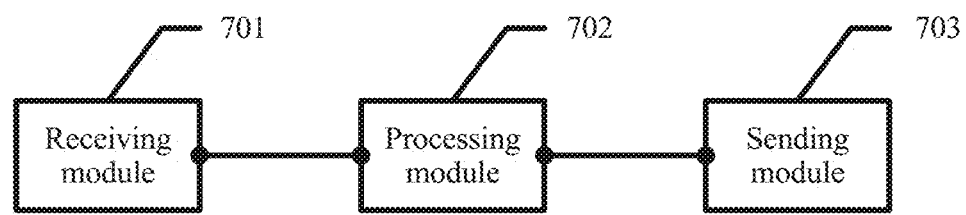
FIG. 7 is a schematic diagram of an embodiment of a terminal according to an embodiment of this application.

Specifically, FIG. 7 shows an embodiment of a terminal according to an embodiment of this application, and the terminal includes a receiving module 701, a processing module 702, and a sending module 703.

The receiving module 701 is configured to: after the terminal and a gateway complete two-way authentication, receive an encrypted random number Rand-M-Encry and a random number Rand-M that are sent by the gateway, where the Rand-M-Encry is generated by the gateway by encrypting the Rand-M by using a first shared key Ksm, and the Rand-M is generated by the gateway.

The processing module 702 is configured to: perform a second preset algorithm on the Rand-M and a shared key Kpsa-xi that is of the terminal and a server to generate Ksx, where the Kpsa-xi and the second preset algorithm are preconfigured by the terminal and the server; and encrypt Data by using the Ksx, to obtain Data-Encry, and perform an operation on the Ksx and the Data based on a first preset algorithm to obtain Data-Hash, where the first preset algorithm is preconfigured by the terminal and the server.

The sending module 703 is configured to send the Rand-M-Encry, the Data-Encry, and the Data-Hash to the server, so that the server completes authentication based on the Rand-M-Encry, the Data-Encry, and the Data-Hash.

With reference to the foregoing embodiment, the first preset algorithm is a hash operation. The second preset algorithm is a hash-based message authentication code algorithm HMAC-SHA-256.

In this embodiment, after the receiving module 701 receives the Rand-M-Encry and the Rand-M that are sent by the gateway, the processing module 702 performs the second preset algorithm on the Rand-M and the Kpsa-xi to generate the Ksx, encrypts the Data by using the Ksx, to obtain the Data-Encry, and performs an operation on the Ksx and the Data based on the first preset algorithm to obtain the Data-Hash; and then the sending module 703 sends the Data-Encry, the Rand-M-Encry, and the Data-Hash to the server, helping the server perform authentication with the terminal by using the Data-Encry, the Rand-M-Encry, and the Data-Hash.

Further, the terminal in FIG. 7 may be further configured to perform any step performed by the terminal in FIG. 1 or FIG. 2A and FIG. 2B, to implement any function that may be implemented by the terminal in FIG. 1 or FIG. 2A and FIG. 2B.

Figure 8:
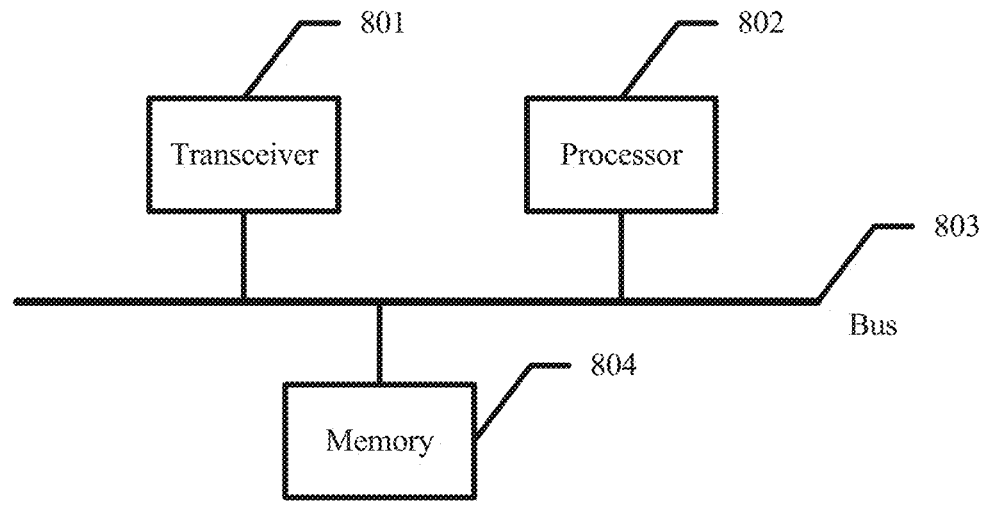
FIG. 8 is a schematic diagram of another embodiment of a terminal according to an embodiment of this application.

Specifically, FIG. 8 shows another embodiment of a terminal according to an embodiment of this application, and the terminal includes a transceiver 801 and a processor 802. The transceiver 801 and the processor 802 are connected to each other by using a bus 803.

The bus 803 may be a PCI bus, an EISA bus, or the like. The bus may be classified into an address bus, a data bus, a control bus, and the like. For ease of indication, the bus is indicated by using only one bold line in FIG. 8. However, it does not indicate that there is only one bus or only one type of bus.

The processor 802 may be a CPU, an NP, or a combination of a CPU and an NP.

The processor 802 may further include a hardware chip. The hardware chip may be an ASIC, a PLD, or a combination thereof. The PLD may be a CPLD, an FPGA, a GAL, or any combination thereof.

Referring to FIG. 8, the terminal may further include a memory 804, and the memory 804 is configured to store the Ksx.

The memory 804 may include a volatile memory, for example, a RAM; or the memory may include a nonvolatile memory, for example, a flash memory, an HDD, or an SSD; or the memory 804 may include a combination of the foregoing memories.

Optionally, the memory 804 may be further configured to store a program instruction. The processor 802 may perform one or more steps or an optional implementation of the terminal in the embodiment shown in FIG. 2A and FIG. 2B by invoking the program instruction stored in the memory 804, to implement a function of the terminal in the foregoing method.

The transceiver 801 includes a radio frequency module and an antenna, and the radio frequency module may be connected to the processor 802 by using the bus 803. The radio frequency module and the antenna perform the following step: after the terminal and a gateway complete two-way authentication, receiving an encrypted random number Rand-M-Encry and a random number Rand-M that are sent by the gateway, where the Rand-M-Encry is generated by the gateway by encrypting the Rand-M by using a first shared key Ksm, and the Rand-M is generated by the gateway.

The processor 802 performs step 205 and step 206 in the foregoing embodiment.

The transceiver 801 performs an operation of sending the Rand-M-Encry, Data-Encry, and Data-Hash to the gateway by the terminal in step 207 in the foregoing embodiment.

In this embodiment, after the transceiver 801 receives the Rand-M-Encry and the Rand-M that are sent by the gateway, the processor 802 performs a second preset algorithm on the Rand-M and Kpsa-xi to generate the Ksx, encrypts Data by using the Ksx, to obtain the Data-Encry, and performs an operation on the Ksx and the Data based on a first preset algorithm to obtain the Data-Hash; and then the transceiver 801 sends the Data-Encry, the Rand-M-Encry, and the Data-Hash to the server, helping the server perform authentication with the terminal by using the Data-Encry, the Rand-M-Encry, and the Data-Hash.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or some of the technical solutions may be implemented in the form of a software product. The software product is stored in a storage medium and includes several instructions for instructing a computer device (which may be a personal computer, a server, a network device, or the like) to perform all or some of the steps of the methods described in the embodiments of The present disclosure. The foregoing storage medium includes: any medium that can store program code, such as a USB flash drive, a removable hard disk, a read-only memory (ROM), a random access memory (RAM), a magnetic disk, or an optical disc.

The foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. An authentication method, comprising:
    obtaining, by a server, a first key (Ksm) shared with a gateway;
    receiving, by the server, an encrypted first random factor (Rand-M-Encry), a first data digest (Data-Hash), and encrypted first data (Data-Encry) that are sent by a terminal, wherein the Rand-M-Encry is generated by the gateway by encrypting a first random factor (Rand-M) by using the Ksm, the Data-Hash is obtained by the terminal by performing an operation on a second key (Ksx) and first data (Data) based on a first preset algorithm, the Data-Encry is obtained by encrypting the Data by using the Ksx, the Ksx is generated by performing an operation on the Rand-M and a key (Kpsa-xi) that is shared by the terminal with the server by using a second preset algorithm, the Kpsa-xi, the first preset algorithm, and the second preset algorithm are preconfigured by the terminal and the server, and the Rand-M is generated by the gateway and sent to the terminal;
    decrypting, by the server, the Rand-M-Encry by using the Ksm, to obtain a second random factor (Rand-M');
    performing, by the server, an operation on the Rand-M' and the Kpsa-xi by using the second preset algorithm, to generate a third key (K'sx);
    decrypting, by the server, the Data-Encry by using the K'sx, to obtain second data (Data');
    performing, by the server, an operation on the K'sx and the Data' based on the first preset algorithm to obtain a second data digest (Data-Hash'); and
    if the Data-Hash' is the same as the Data-Hash, determining, by the server, that authentication of the terminal succeeds.

2. The method according to claim 1, wherein obtaining, by a server, a first key (Ksm) shared with a gateway comprises:
    obtaining, by the server, a third random factor (Rand-author), wherein the Rand-author is shared by the server with the gateway; and
    performing, by the server, an operation on the Rand-author and a second shared key (Kpsa-mi) based on a third preset algorithm, to generate the Ksm, wherein the Kpsa-mi is preconfigured by the server and the gateway, and the third preset algorithm is preconfigured by the server and the gateway or is determined through negotiation between the server and the gateway.

3. The method according to claim 2, wherein obtaining, by the server, a third random factor (Rand-author) comprises:
    generating, by the server, the Rand-author; or
    receiving, by the server, the Rand-author sent by the gateway.

4. An authentication method, comprising:
    obtaining, by a gateway, a first key (Ksm) shared with a server;
    generating, by the gateway, a first random factor (Rand-M);
    encrypting, by the gateway, the Rand-M by using the Ksm, to generate an encrypted first random factor (Rand-M-Encry); and
    after the gateway and a terminal complete two-way authentication, sending, by the gateway, the Rand-M-Encry and the Rand-M to the terminal for enabling the terminal to generate a second key (Ksx) based on the Rand-M.

5. The method according to claim 4, wherein obtaining, by a gateway, a first key (Ksm) shared with a server comprises:
    obtaining, by the gateway, a third random factor (Rand-author), wherein the Rand-author is shared by the server with the gateway; and
    performing, by the gateway, a third preset algorithm on the Rand-author and a second shared key (Kpsa-mi) to generate the Ksm, wherein the Kpsa-mi is preconfigured by the server and the gateway, and the third preset algorithm is preconfigured by the server and the gateway or is determined through negotiation between the server and the gateway.

6. The method according to claim 5, wherein obtaining, by the gateway, a third random factor (Rand-author) comprises:
    generating, by the gateway, the Rand-author; or
    receiving, by the gateway, the Rand-author sent by the server.

7. An authentication method, comprising:
    after a terminal and a gateway complete two-way authentication, receiving, by the terminal, an encrypted first random factor (Rand-M-Encry) and a first random factor (Rand-M) that are sent by the gateway, wherein the Rand-M-Encry is generated by the gateway by encrypting the Rand-M by using a first key Ksm, and the Rand-M is generated by the gateway;
    performing, by the terminal, a second preset algorithm on the Rand-M and a key (Kpsa-xi) that is shared by the terminal with a server, to generate a second key (Ksx), wherein the Kpsa-xi and the second preset algorithm are preconfigured by the terminal and the server;
    encrypting, by the terminal, first data (Data) by using the Ksx, to obtain Data-Encry, and performing an operation on the Ksx and the Data based on a first preset algorithm to obtain Data-Hash, wherein the first preset algorithm is preconfigured by the terminal and the server; and
    sending, by the terminal, the Rand-M-Encry, the Data-Encry, and the Data-Hash to the server for enabling the server to complete authentication based on the Rand-M-Encry, the Data-Encry, and the Data-Hash.

8. The method according to claim 7, wherein the first preset algorithm is a hash operation.

9. The method according to claim 7, wherein the second preset algorithm is a hash-based message authentication code algorithm HMAC-SHA-256.

* * * * *